F. W. KEMPER.
TRANSMISSION MECHANISM FOR POWER DRIVEN VEHICLES.
APPLICATION FILED JULY 14, 1916.

Patented Oct. 16, 1917.

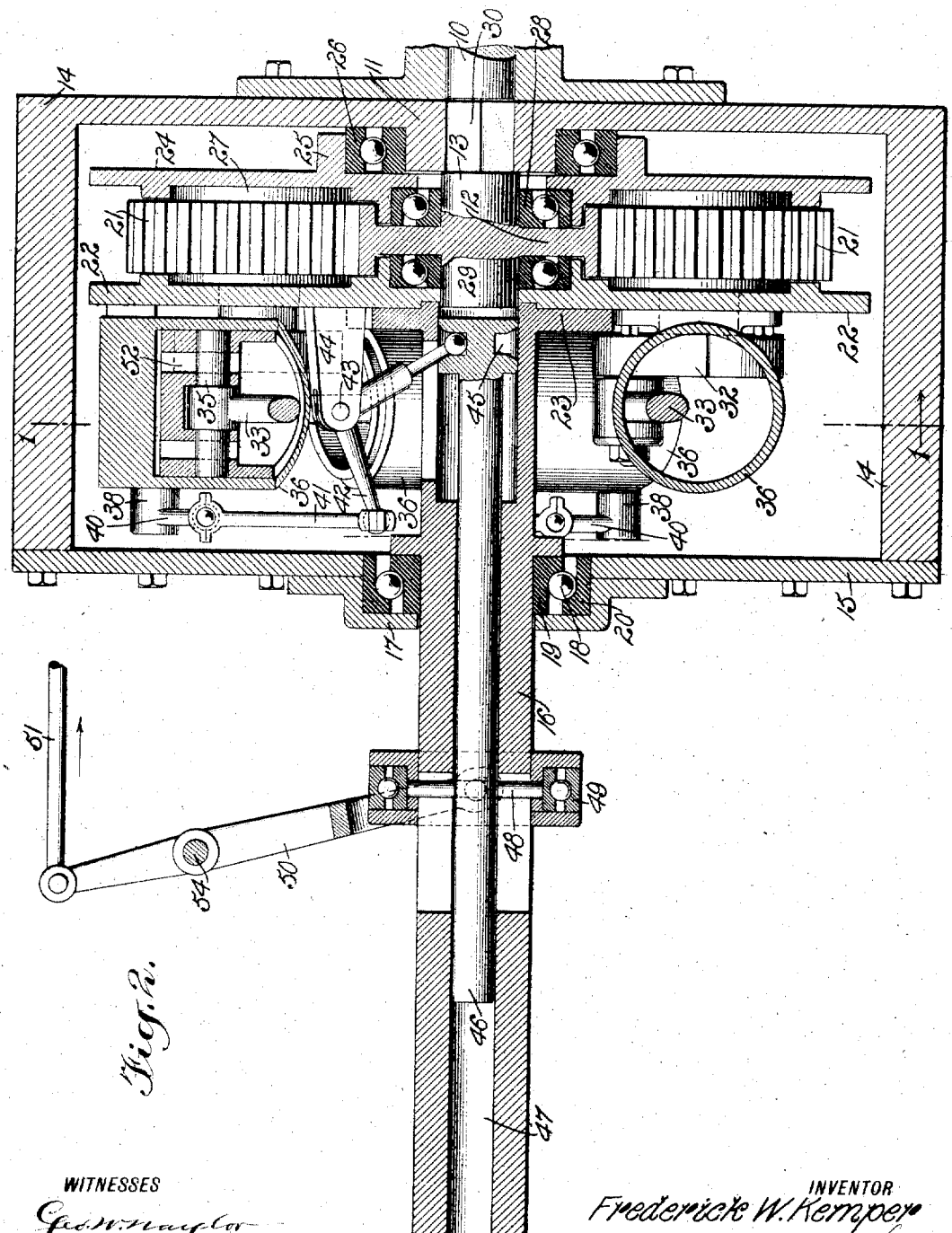

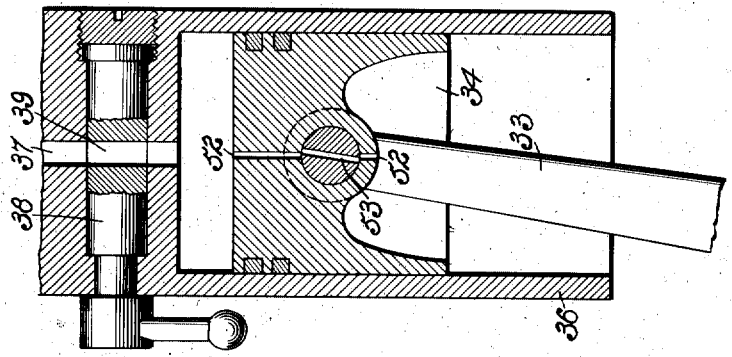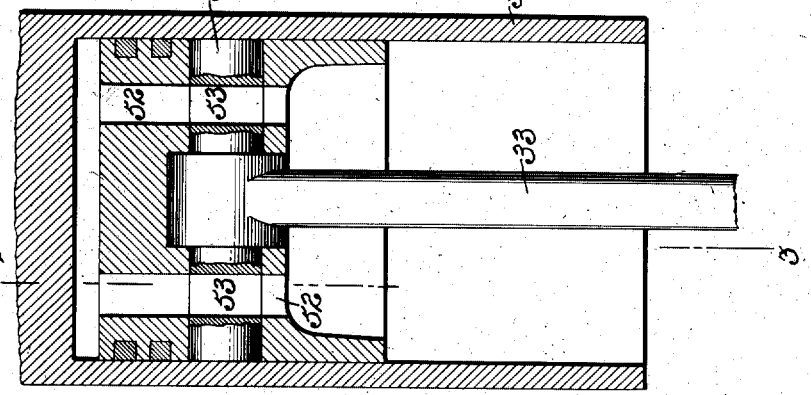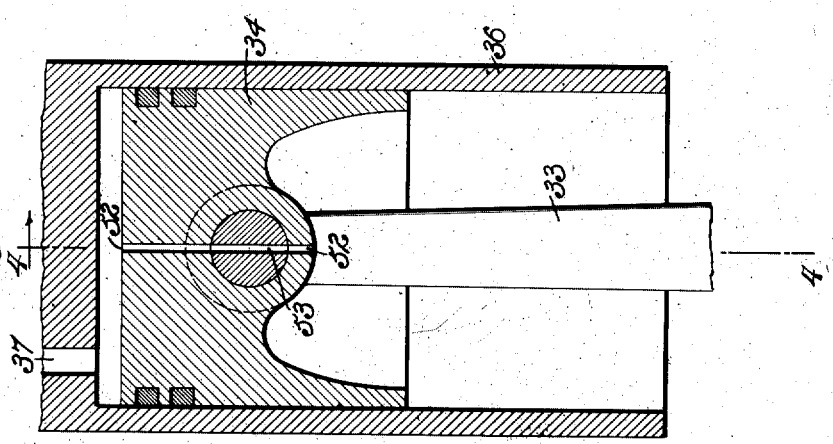

UNITED STATES PATENT OFFICE.

FREDERICK W. KEMPER, OF NEW YORK, N. Y.

TRANSMISSION MECHANISM FOR POWER-DRIVEN VEHICLES.

1,243,611.      Specification of Letters Patent.      Patented Oct. 16, 1917.

Application filed July 14, 1916. Serial No. 109,257.

*To all whom it may concern:*

Be it known that I, FREDERICK W. KEMPER, a citizen of the United States, and a resident of the city of New York, borough of Manhattan, in the county and State of New York, have invented a new and Improved Transmission Mechanism for Power-Driven Vehicles, of which the following is a full, clear, and exact description.

Among the principal objects which the present invention has in view are: To vary the rate of rotation transmitted from a driving shaft to a driven shaft; to provide means for controlling the transmission; to avoid shock to the mechanism; and to release said driving shaft from all load during the idling of the engine with which it is connected.

*Drawings.*

Fig. 2 is a longitudinal section of the same, the section being taken as on the line 2—2 in Fig. 1;

Fig. 3 is a detail view on an enlarged scale and in section, showing one of the compression cylinders and piston therefor, the section being taken as on the line 3—3 in Fig. 4;

Fig. 4 is a detail view in section of the above-mentioned cylinder and piston, the section being diametrically opposed to that shown in Fig. 3 and taken as on the line 4—4 in Fig. 3;

Fig. 5 is a detail view on an enlarged scale of the above-mentioned cylinder and piston, and of a rotary controlling valve therefor.

*Description.*

Figure 1:
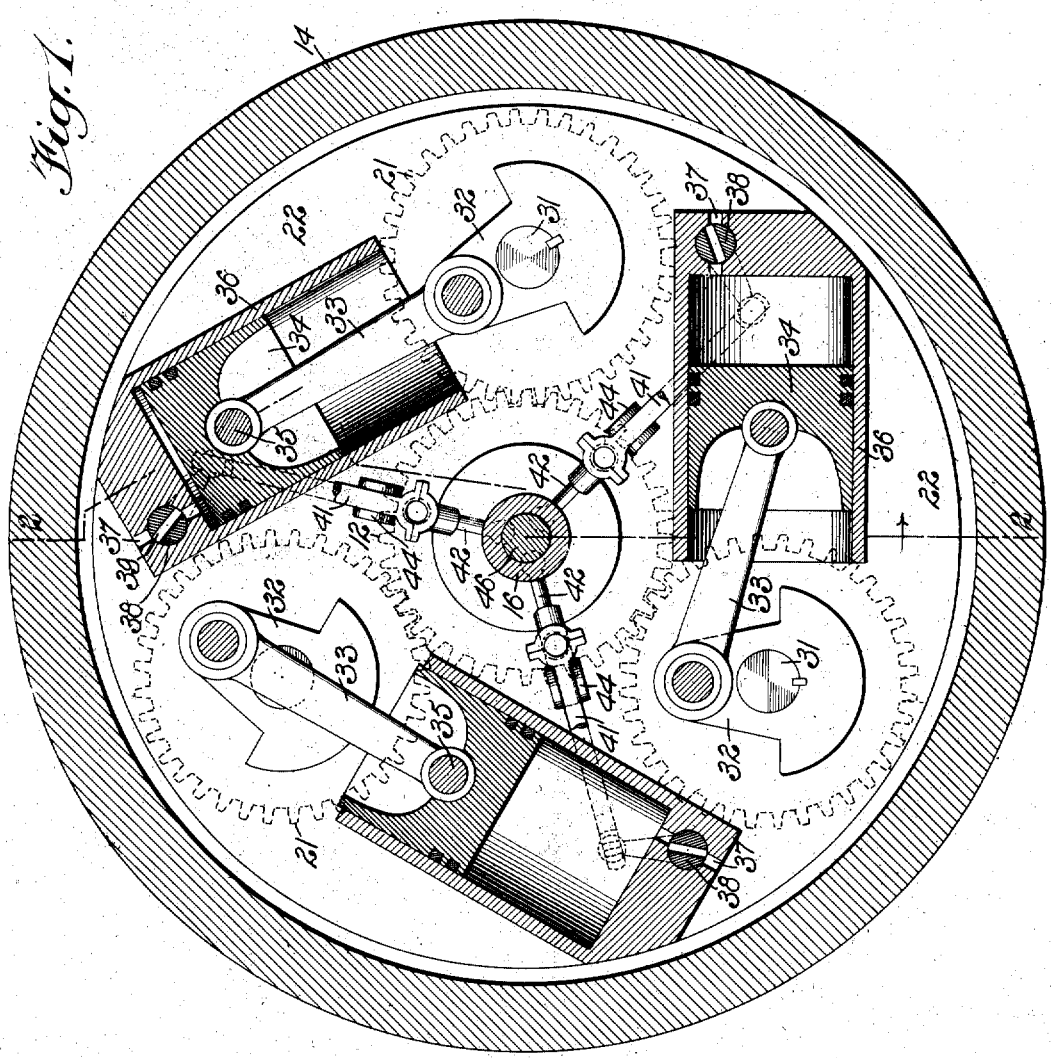
Figure 1 is a vertical cross section of a transmission mechanism constructed and arranged in accordance with the present invention, the section being taken as on the line 1—1 in Fig. 2.

As shown best in Fig. 2 of the drawings, a driving shaft 10 has permanently mounted thereon a fly wheel 11. A gear pinion 12 is integrally formed on a short shaft 13. The fly wheel 11 is preferably cased, the perimeter 14 having a dressed outer edge on which is fitted a face plate 15. Through the face plate 15 passes a transmission or driven shaft 16. The shaft 16 is passed through a central orifice in a housing cap 17. The shaft 16 is supported in the housing cap 17 and plate 15 by a ball bearing having balls 18 and races 19 and 20, the former being mounted on the said shaft and the latter within the said housing cap.

Power is transmitted from the driving shaft 10 to the driven shaft 16, through the pinion 12, gear wheels 21, and disk 22, said disk being rigidly and permanently connected to the shaft 16, a bolting flange 23 being provided at the end of said shaft 16 for this purpose. A second disk 24 is rigidly connected with the disk 22 to form a cage to contain the gear wheels 21 and pinion 12. The disk 24 has an annular supporting flange 25, between which and the hub of the fly wheel 11 is disposed a ball bearing 26. Both the disks 22 and 24 are suitably shaped to receive the ball bearings 27 and 28, the former provided for the wheels 21 and the latter for the pinion 12.

The pinion 12 is rigidly mounted on a short shaft 13, which is provided with a squared extension 30 for engagement with the wheel 11, said wheel being provided with a squared socket for receiving the extension 30. This arrangement permits the withdrawal from the fly wheel 11, of the disks 22 and 24, the gear wheels 21 and the pinion 12, and the shaft 16 and parts connected therewith.

As seen best in Fig. 1 of the drawings, the shafts 31 of the gear wheels 21 are each provided with a crank arm 32. The arms 32 are each pivotally connected with a piston rod 33, the piston rods 33 being attached to pistons 34 by wrist pins 35, the said pins 35 being rigidly connected to the piston rods and rocking in the pistons 34. The pistons 34 are each reciprocatively mounted in a cylinder 36. The cylinders 36 are rigidly mounted on the disk 22 and have solid heads except for a passage 37 which is controlled by a rocking valve 38. Each rocking valve 38 has a passage 39 for registry each with the passage 37 in one of the cylinders. It is obvious that as the valves 38 are rocked to open or close the passages 37 in the heads of the cylinders 36, the operation of the pistons 34 is retarded or accelerated, and in correspondence the gear wheels 21 are free to rotate on their shafts 31, or are controlled in the rotation to the end that the disks 22 and 24, and parts connected therewith gyrate about the axes of the shaft 10 and fly wheel 11; to permit the shaft 10 and pinion 12 to run free.

The reciprocation of the pistons 34 is controlled by liquid or air trapped partially or completely therein by the movement of the valves 38. The valves 38 have each a crank arm 40, which is connected by a link rod 41 to one arm of a bell crank lever 42. The levers 42 are each mounted by pivot pins 43, in brackets 44 mounted upon the disk 22 and extended from the face thereof. One end of each of said levers 42 extends into a groove 45 in the end of a thrust rod 46. The rod 46 is slidably mounted in a bore 47 in the shaft 16. The rod 46 is connected by a pin 48 to the inner member of a ball-race 49. The outer member of the ball-race 49 is held stationary by a rocking lever 50, the upper end of which is connected by a rod 51 with the foot controls of an automobile.

To relieve the pistons 34 and to avoid shocks therein, each piston is provided with narrow slots or passages 52. The pins 35 are similarly provided with passages 53. The slots 52 and passages 53 fully register when the piston rods 33 are alined with the axes of the cylinders 36, as best shown in Fig. 3 of the drawings. When the piston rods 33 are rocked by the crank arms 32 to the position shown at the lower portion of Fig. 1, or as shown in Fig. 5, of the drawings, the passages 53 are carried out of register with the slots 52. In this position of the slots 52 and passages 53, the air or liquid in the cylinder 36 is trapped, providing the valve 38 of said cylinder is closed.

It is obvious that with the above described construction, the operation results in each piston compressing a charge of air or liquid in the cylinder in which it is mounted until as the peak of the compression or expansion is approached, the passages 53 are rocked into registry and thereby relieve the compression or expansion. When thus constructed the parts function to cushion the operation of the pistons 34 and cylinders 36, with the result that the control of the wheels 21 is devoid of shock thereto.

*Operation.*

With a mechanism constructed and arranged as above described and as shown in the accompanying drawings, the operation is as follows: When the engine is idling, the lever 50 is moved to the position as shown in Fig. 2 of the drawings. In this position, the various levers 42 are rocked to revolve the valves 38 until the passages 39 therein fully register with the passages 37 in the heads of the cylinders 36.

While the valves are in the position above indicated, it is obvious that the air or liquid for controlling the pistons 34 is drawn freely into the cylinders and as freely ejected therefrom, offering no resistance to the reciprocation of the said pistons and the run of the wheels 21 in unison with the pinion 12 and shaft 10. The shaft 16 moving in unison with the car on which it is mounted, maintains stationary the disks 22 and 24 and parts connected therewith.

When it becomes necessary to drive the shaft 16, the lever 50 is rocked on its shaft 54 by manual control of the rod 51, to the end that the race 49 and casing thereof and rod 46 are retracted and the levers 42 rocked to rotate the valves 38 and partially close the passages 37 in the cylinders 36. In correspondence with the contraction of these passages 37, it is obvious that the intake and ejectment of the air or liquid in the cylinders is restrained and pressure is applied thereby to the pistons 34 to retard the rotation of the wheels 21. In proportion as the wheels 21 are retarded in their rotation, the gyration of the disks 22 and 24, and parts connected therewith is accelerated. In correspondence with the movement of the lever 50, the valves 38 are rocked to completely close the passages 37 when the mechanism would effectively prevent the rotation of the wheels 21, thereby operating to practically lock the same in engagement with the pinions 12 and shaft 10.

From the foregoing it will be seen that the attendant may at all times vary the speed of the rotation of the shaft 16 by shifting the lever 50 and the valves 38 operatively connected therewith to increase or diminish the pressure in the cylinder 36 and the consequent rate of rotation of the wheels 21 relative to the pinion 12 much in the same manner as the operation of what is known as a planetary gear.

While I have herein described the invention as employing air in the cylinders 36, I wish it to be understood that when desired the chamber formed in the fly wheel 11 and covered by the face plate 15, may be filled with oil or other suitable liquid. This oil or liquid will be drawn into and expelled from the cylinders 36 in the manner as above described with reference to air. Any suitable fluid medium may be employed in lieu of the air or oil.

While the invention has been described with reference to a transmission adapted for employment in automobile construction, it is also desired that it shall be understood that the invention is equally applicable to transmissions for boats or other structures.

*Claims.*

1. A mechanism as characterized comprising a continuously rotating driving shaft; a driven shaft, said driven shaft having a tubular end disposed in service adjacent to and coaxial with said driving shaft; a transmission mechanism interposed between said shafts, said mechanism embodying a rotary member rigidly connected with said driving shaft; rotary transmission members operatively engaged with said rotary member; means for retarding the rotation of said transmission members, said means embodying a reciprocating member disposed in the tubular end of said driven shaft; and means for manually shifting said reciprocating member to retard or accelerate the movement of said transmission members.

2. A mechanism as characterized comprising a continuously rotating driving shaft; a driven shaft, said driven shaft having a tubular end disposed in service adjacent to and coaxial with said driving shaft; a transmission mechanism interposed between said shafts, said mechanism embodying a rotary member rigidly connected with said driving shaft; rotary transmission members operatively engaging with said rotary member; means for retarding the rotation of said transmission members, said means embodying a reciprocating member disposed in the tubular end of said driven shaft; and means for manually shifting said reciprocating member to retard or accelerate the movement of said transmission members, said means embodying a sliding collar mounted on said driven shaft and operatively connected with the reciprocating member in the tubular end thereof, a ring mounted on said collar, friction-reducing devices disposed between said ring and said collar, and a shifting mechanism for said collar pivotally connected with said ring, whereby said collar and rod connected therewith may be readily reciprocated to and from said transmission members.

3. In a mechanism as characterized, the combination of a continuously rotating driving shaft; a cup-like fly wheel rigidly mounted thereon, said fly wheel having a rectangular central opening concentric with said driving shaft; a face plate for covering the open end of said fly wheel; a driven shaft extending through said face plate within said fly wheel; a variable speed transmission mechanism for operatively connecting said shafts, said transmission mechanism embodying a short shaft extending between and concentric with both of said first-mentioned shafts, said short shaft having a rectangular extension for fitting said rectangular opening in said fly wheel; a driving pinion rigidly mounted on said short shaft; a plurality of gear wheels operatively engaging said pinion; a plurality of disks surrounding said pinion and concentric therewith, said disks providing bearings for said gear wheels; and a plurality of friction-reducing bearings for said driven shaft, said short shaft, and said disks for maintaining the alinement of said shafts and said fly wheel.

4. In a mechanism as characterized, a cylinder closed at one end; a piston reciprocatively mounted in said cylinder; a crank-driven connecting rod reciprocating said piston, said connecting rod being pivotally connected with said piston; a wrist pin operatively connecting said connecting rod and said piston; and means for equalizing the medium in said cylinder with the surrounding atmosphere at the extremes of the movement of said piston, said means embodying a plurality of slots in said piston, wrist pin, and connecting rod, said slots being adapted to aline at the extremities of the stroke of said piston.

FREDERICK W. KEMPER.